United States Patent [19]

Armond et al.

[11] 4,354,149
[45] Oct. 12, 1982

[54] BATTERY CHARGE SYSTEM

[76] Inventors: Joseph A. Armond; Gabriel R. Buky, both of c/o Electro-Matic Products Co., 2235 N. Knox Ave., Chicago, Ill. 60639

[21] Appl. No.: 186,509

[22] Filed: Sep. 11, 1980

[51] Int. Cl.³ .............................................. H02J 7/04
[52] U.S. Cl. ...................................... 320/40; 307/66; 335/290; 361/139; 361/145
[58] Field of Search .................... 307/66; 320/32, 39, 320/22, 40; 361/139, 145; 335/290

[56] References Cited

U.S. PATENT DOCUMENTS

| | | | |
|---|---|---|---|
| Re. 25,607 | 6/1964 | Littwin | 361/149 |
| 2,786,970 | 3/1957 | Connoy | 361/145 |
| 3,531,706 | 9/1970 | Mullersman | 320/35 X |
| 3,890,556 | 6/1975 | Melling et al. | 320/39 X |
| 4,032,828 | 6/1977 | Strobl et al. | 320/39 |

*Primary Examiner*—Robert J. Hickey
*Attorney, Agent, or Firm*—Paul H. Gallagher

[57] ABSTRACT

A battery charge system for a transfer magnet (heretofore generally known as a lift magnet) and for a chuck control. In the case of the transfer magnet, the battery provides constant power, while in the case of the chuck control, it serves as a standby power. The charge system is automatically connected when the charge on the battery reaches a predetermined minimum, and disconnected when it is charged to a predetermined maximum. The battery in each case is connected with the usual utility source of AC, and upon the voltage of the battery reaching the levels mentioned, the AC source is respectively connected or disconnected.

10 Claims, 8 Drawing Figures

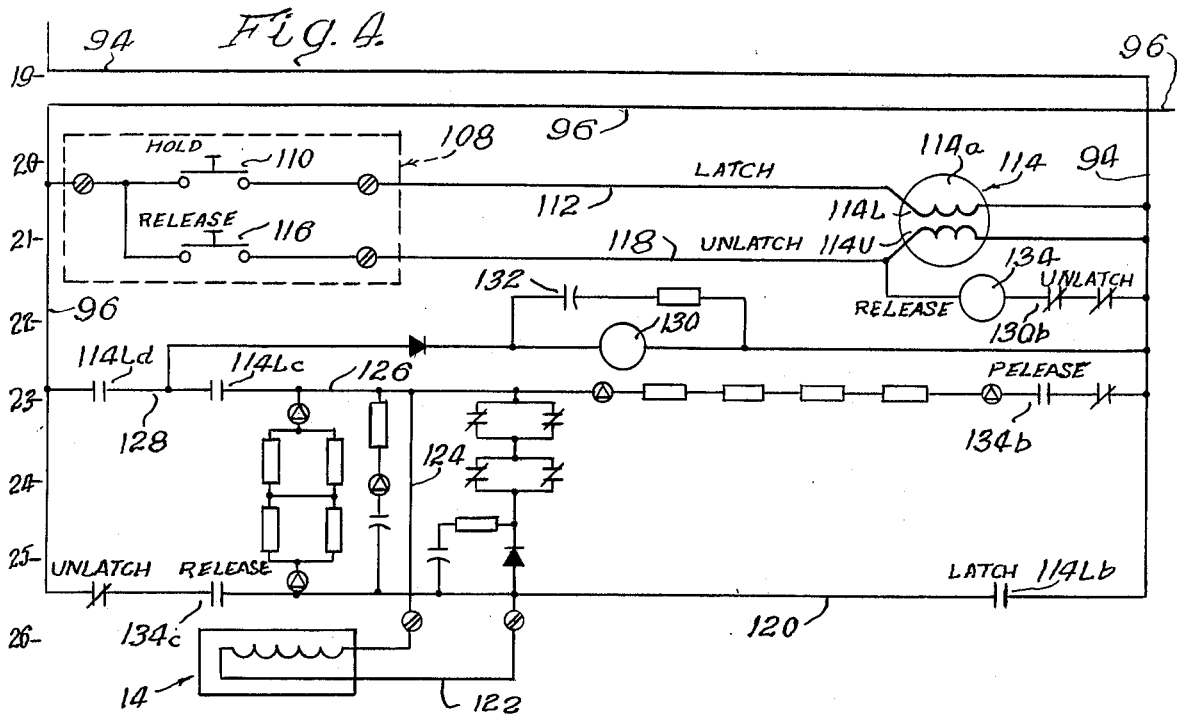
Fig. 4.
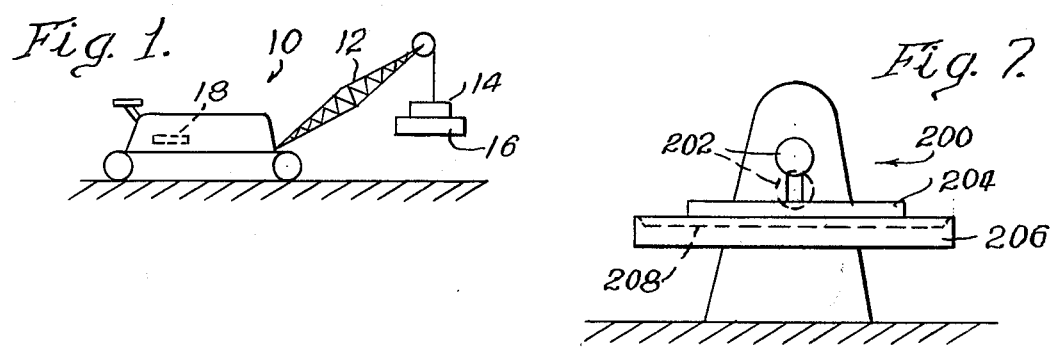
Fig. 1.
Fig. 7.
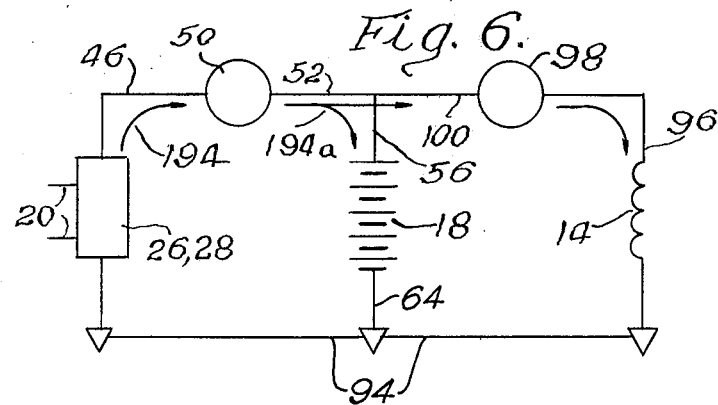
Fig. 2.
Fig. 6.

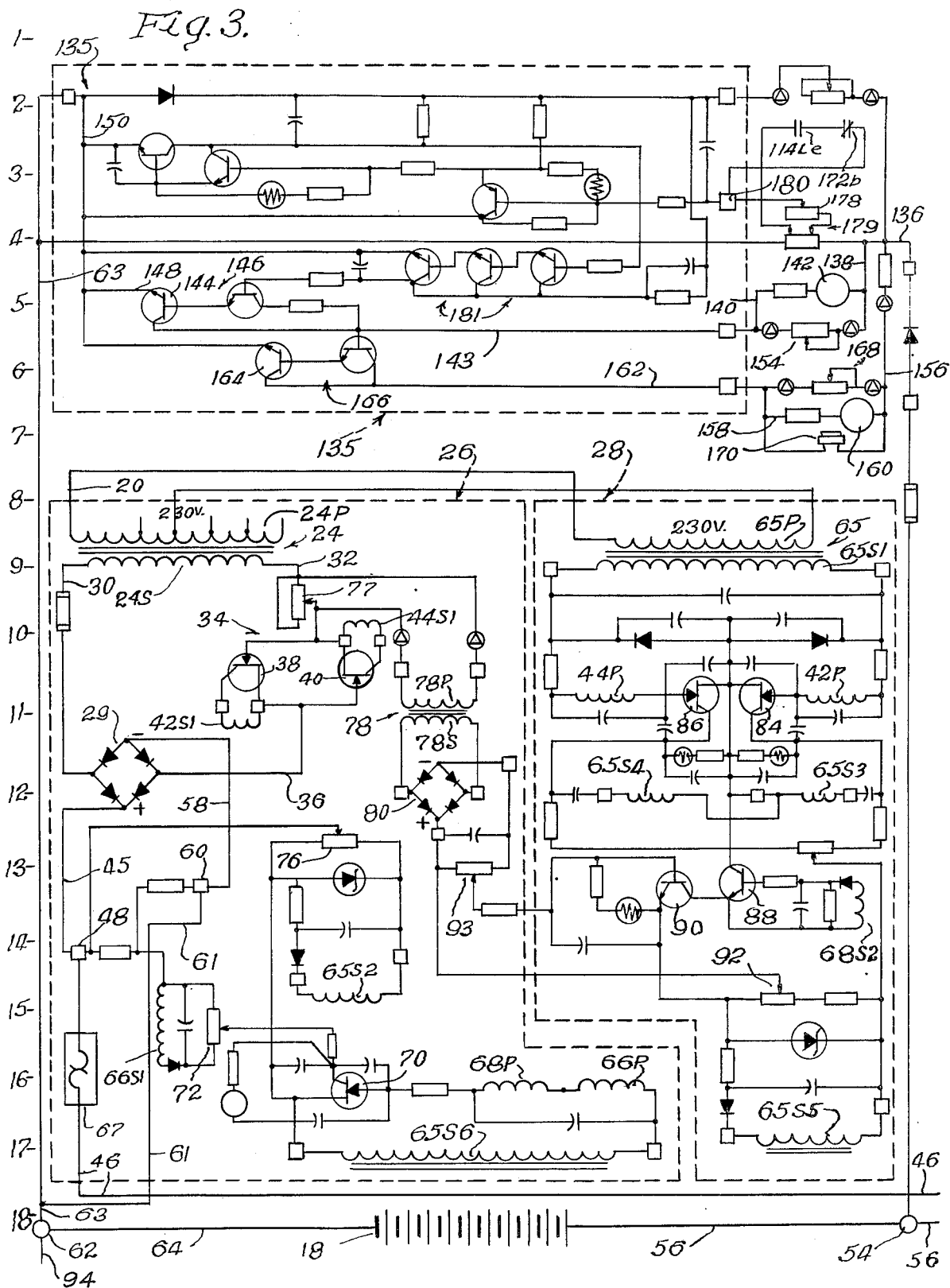

Fig. 8.

BATTERY CHARGE SYSTEM

OBJECTS OF THE INVENTION

A broad object of the invention is to provide a novel arrangement for charging a battery automatically from a general source upon the voltage level of the battery reaching a predetermined minimum.

Another broad object is to provide an arrangement of the foregoing character effective either:

(a) In the case of a transfer magnet where the battery provides constant force for energizing the magnet, and a main or general source, such as a utility company source, is connected for charging the battery when the voltage level thereof reaches a predetermined minimum level, or (b) In the case of a chuck control where the main source is connected constantly for energizing the magnet, and upon interruption of that source, the battery, acting as a standby, is automatically connected to the magnet, and upon the main source being re-established, it is again automatically connected to the magnet, and it is also connected to the battery and it charges it to a predetermined maximum.

DESCRIPTION OF A PREFERRED EMBODIMENT:

In the drawings:

FIG. 1 is a semi-diagrammatic view of a crane of a type suitable for embodying a transfer magnet to which the present invention is applicable;

FIG. 2 is a chart showing the arrangement of FIGS. 3, 4 and 5, which then so put together form a single main circuit diagram;

FIG. 3 shows a portion of the electrical circuit indicated in FIG. 2;

FIG. 4 shows another portion of the electrical circuit, indicated in FIG. 2;

FIG. 6 is a simplified diagram indicating the functioning of the main source, the battery, and the magnet, when they are connected together;

FIG. 7 is a semi-diagrammatic view of a machine tool embodying a chuck control, to which the invention is applicable;

FIG. 8 is an electrical circuit diagram of a chuck control, incorporated in a demagnetizing apparatus, and its incorporation with the battery charge system.

Figure 5:
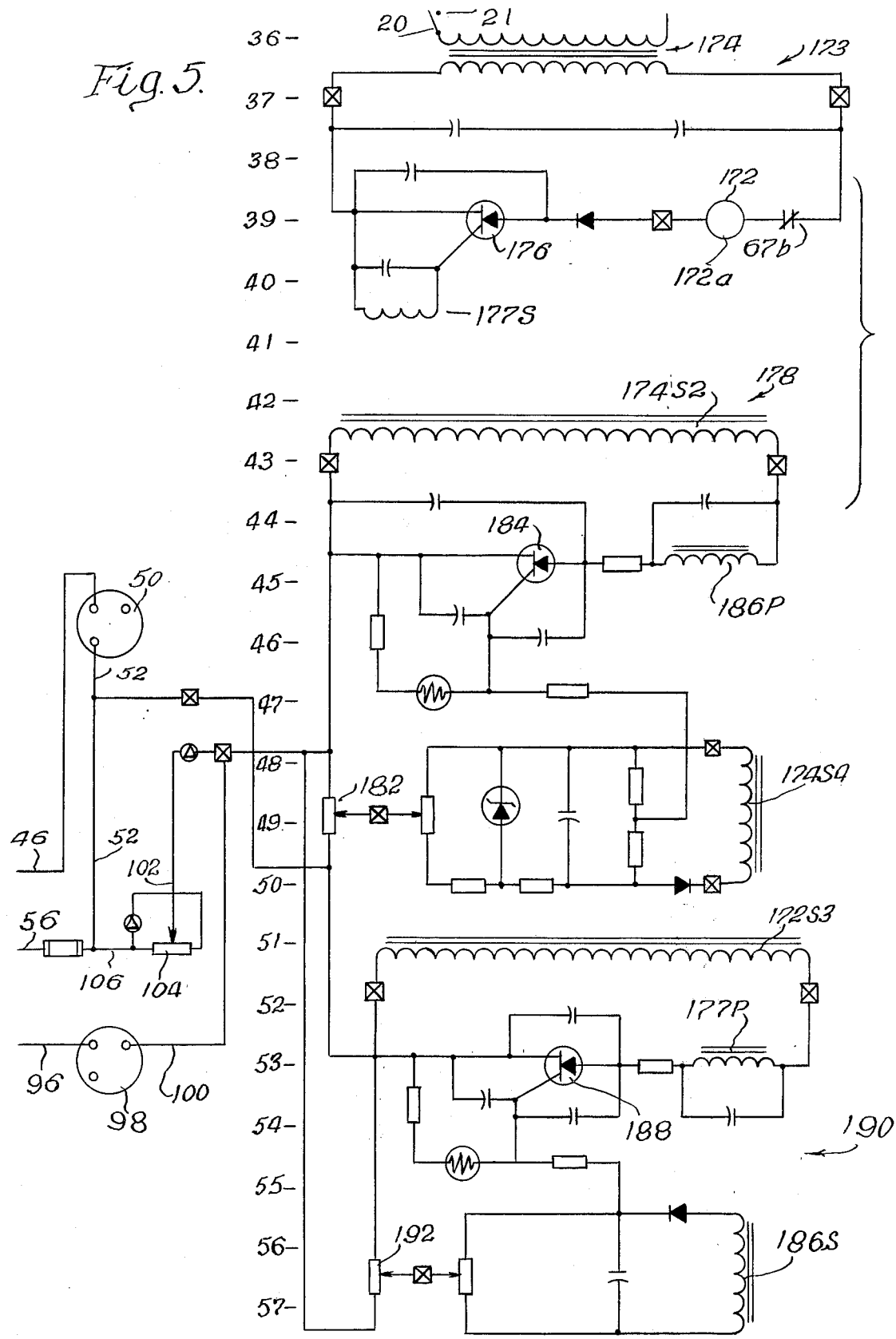
FIG. 5 shows the third portion of the electrical circuit indicated in FIG. 2.

The present invention is directed broadly to a concept of maintaining a battery in charged condition, the arrangement being such that when the battery voltage drops to a predetermined minimum, the charging system automatically comes into effect, and in response to such charging operation, when the voltage level reaches a predetermined maximum, the charge system is automatically disconnected. The charge system in the present invention assumes two different forms, (a) in the case of a transfer magnet, a battery is used as a constant source of power for energizing the magnet, and a main electrical source, such as utility company source, is utilized for charging the battery, and (b) in the case of a chuck control, a magnet is utilized for holding down a workpiece, and the main source is utilized as the constant source for energizing the magnet, and in the failure of such general source, the battery provided acts as a standby source and is automatically connected for continuing the energization of the magnet, and upon the re-establishment of the main source, the latter comes into play to maintain the magnet energized. In the latter case, the main source also is automatically connected to re-charge the battery while still energizing the magnet.

Figure 8:
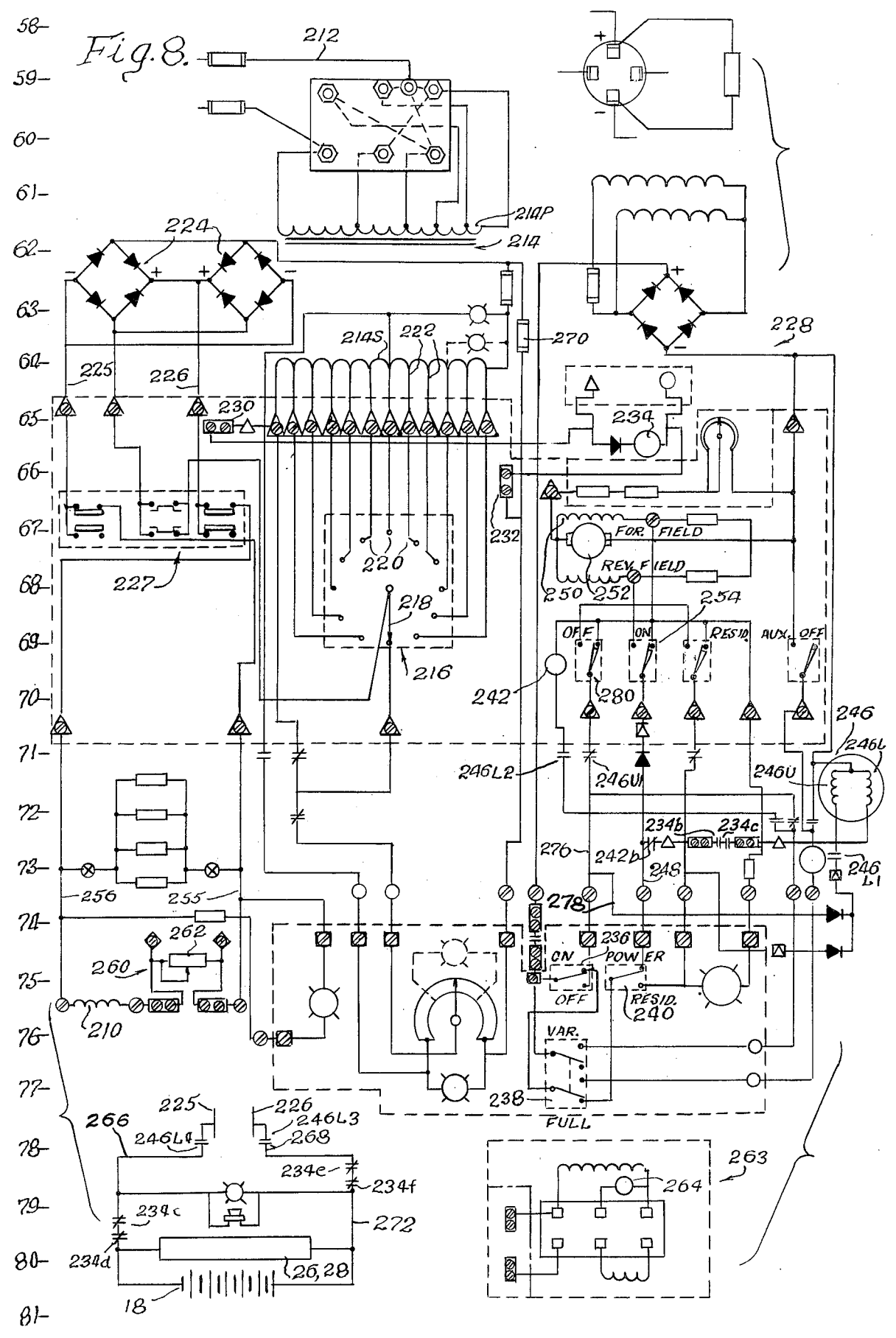

The first form of the invention, (a) is represented in FIGS. 1–6 and the second form, (b) is represented in FIGS. 7 and 8.

In the case of the first form of invention, represented in FIGS. 1–5, FIG. 1 shows a lift truck or crane 10 having a derrick 12 carrying an electro-magnet 14 heretofore generally called a lift magnet, and presently often called a transfer magnet. It is also referred to herein simply as a magnet. The magnet 14 upon being energized is capable of lifting a load 16 for carrying it or transferring it to another location. The magnet 14 is energized by a battery 18. In the circuit diagram, the battery 18 as shown at (18) at the bottom of FIG. 3 and the magnet 14 is shown at (26) at the bottom of FIG. 4

In the electrical circuitry, the diagrams are provided with line numbers at the left margins thereof to facilitate designating the locations of various elements referred to, those line numbers being given in parenthesis following the references in the specification to the corresponding elements.

In the identification of transformers, the transformers as a whole are designated with principal reference numerals, and the primary and secondary coils thereof with the same reference numerals with the postscripts P and S respectively. Similarly, in the case of relays, the relays as a whole are designated with principal reference numerals, while the coils thereof are designated with the same reference numerals and the postscript a, and the contacts also with the same reference numerals, but with the postscripts b, c, d, etc. In the case of latch relays, the individual coils are further identified with the postscripts L (latch) and U (unlatch).

A main source or general source such as a utility company source is indicated at 20 (8, 36) which may include a main switch 21, this source leading to a power transformer 24 (9) including a primary 24P tapped at 230 volts. The secondary 24S is constantly connected in circuit for charging the battery (18) or is in position to charge it when the circuitry is otherwise completed. The circuitry between the transformer 24 and the battery includes two main components in FIG. 3, a charge control module 26 (8) and a PHASE FIRING NETWORK 28 (8). In a similar manner, the battery is connected in circuit with, or is in position to be connected with, the magnet 14 (26) when the circuitry is otherwise completed. The details of the circuitry for performing these functions will be described hereinbelow.

The networks 26 and 28 of FIG. 3 constitute the means for maintaining the battery in charged condition, and supplying the power direct from the main source when the battery drops below the minimum voltage level. The circuit of FIG. 4 is an operating circuit, that controls the picking up and dropping of the load, and the circuit at the top of FIG. 3 (1)–(7), together with that of FIG. 5 provide warnings to the operator.

Connected in the series with the secondary 24S is a rectifier 29 (11), so connected at one side by a conductor 30, and at the other side by a conductor 32 leading directly from the secondary and then through a sub-unit 34 to another conductor 36 which is connected directly to the other side of the rectifier. The sub-unit 34 includes back-to-back SCRs 38, 40 controlled by corresponding secondaries 42S1 and 44S1 the primaries of which are found at (10).

Leading from the positive side of the rectifier 29 is a conductor 45 including a terminal 48 (14), then to the conductor 46 which continues to an ammeter 50 (46) from which a conductor 52 continues through to the terminal 54 (18) and through the conductor 56 to the battery. Leading from the negative side of the rectifier 29 (11) is a conductor 58, continuing through a terminal 60 (13) and then to a conductor 61 and another conductor 63, to a terminal 62 (18) and a conductor 64, to the battery. The conductor 46 includes a thermal overload fuse 67 (16) which upon overload conditions enables contacts 67b (39) to open.

The PHASE FIRING NETWORK 28 (8) includes a control transformer 65 (9) of which the primary 65P is connected in parallel with the primary 24P and is of 230 V. This transformer includes a secondary 65S6 (17) in the CHARGE CONTROL MODULE 26 in series with transformer primaries 66P, 68P, and an SCR 70. The transformer 66 includes a secondary 66S1 (15) connected with a trimmer potentiometer 72. A further secondary 65S2 (15) is provided in series with another trimmer potentiometer 76 (12).

Referring again to the sub-unit 34 (10) an adjustable dropping resistor 77 is connected in series between the secondary 24S and the sub-unit 34, with which is associated a transformer 78 (10), the secondary of which leads to a rectifier 80, and the output of this rectifier leads to the network 28 (8).

In the network 28 and connected with the secondary 65S1 therein, are SCRs 84, 86 (10) associated with the transformers 42, 44 (10) identified above. Also incorporated in the network 28 are secondaries 65S3, 65S4 (11) associated respectively with the primaries 42P, 44P (10), as well as transistors 88, 90 (13) in series with secondary 68S2 (13) the primary of which, identified above, is at (16). Additionally, trimmer potentiometers 92 and 93 are provided between the rectifier 80 (12) and the network 28.

The circuit of FIG. 4 is connected in parallel with the battery (18) by a conductor 94 at one side leading from the terminal 62 (18) and thus from the battery, and at the other side by a conductor 96 leading indirectly from the battery, i.e., it leads through an ammeter 98 (53) FIG. 5 indicating the load current, to a conductor 100 which leads to another conductor 102 (50) which in turn leads through an adjustable resistor 104 (51) to a conductor 106 which leads to the terminal 54 (18) and then the conductor 56 and hence to the battery.

The circuit of FIG. 4 includes the magnet 14 (26) as noted above, but the direct and immediate relation between the main source, the battery, and magnet, will be referred to again hereinbelow particularly in connection with FIG. 6.

Incorporated in the circuit of FIG. 4, is a remote control station 108 (20) which includes a HOLD manual push-button 110 in a conductor 112 which leads to a latch relay 114, the latter including a first coil 114L (latch) and a second coil 114U (unlatch). It will be observed that the conductor 112 is connected between the conductors 96, 94. Also included in the remote control station 108 (20) is a RELEASE manual pushbutton 116 in a conductor 118 which leads to the relay 114 and specifically the coil 114U therein, this conductor 118 also being connected to the conductor 94, and conductor 96 by way of conductor 112.

To operate the apparatus to lift the load, the operator manually depresses the HOLD pushbutton 110 (20), which energizes the coil 114L in the relay 114, this completing circuit through conductor 94 to the contacts 114Lc and 114Ld. The circuit is then completed through conductors 94, 120, 122, the magnet 14 (26), conductors 124, 126, 128, to the conductor 96, the conductors 94, 96, of course being connected with the battery 18 (18). The closure of the contacts 114Ld as just described, energizes a relay 130 (22) in parallel with a capacitor 132 (22).

In the normal operation, the load is carried pursuant to the magnet being thus energized, and to drop the load, the operator manually depresses the RELEASE pushbutton 116 (21) which energizes the coil 114U in the relay 114. In this step also, the relay 134 (22) is energized, which opens contacts 134b (23) and 134c (25). Also contacts 114Lc (23) and contacts 114Ld (23) are permitted to open in response to the releasing of the latch coil 114L (20). However a delay in this step is accomplished by the capacitor 132 which holds the contacts 130b open momentarily. Upon continued holding of the RELEASE pushbutton 116 (21) an unlatching step is performed.

The trimmer potentiometer 76 (12) senses the level of the battery at terminals 48 (14) and 60 (13) and when the battery reaches its low level, the SCR 70 (16) turns on and another loop is thereby completed through that SCR and through the trimmer potentiometer 76, this second loop completing through secondary 66S2 (15) and the terminals 48 and 60. When the SCR 70 is on, a circuit is completed of course through the secondary 65S6 (17) and energizes primaries 66P and 68P (16); the secondary 66S1 (15) is thereby energized and it holds on the SCR 70 (16), and prevents it from oscillating on and off. The secondary 66S1 (15) senses a scaled voltage from the battery and it works against the effect of the trimmer 72 (15) the latter determining the level up to which the secondary 66S1 (15) functions.

In the turning on of the SCR 70 (16) as referred to, and the consequent energization of the primary 68P in series therewith, the secondary of the latter 68S2 (13) in the network 28 is of course energized and that turns on a blocking transistor 88 (13) and therefore a loop circuit is completed and this enables the circuit from the charging circuit through the transformer 78 (10), the rectifier 80 (11), through another transistor 90 associated with 88, this circuit continuing from the transistor 88 in the network 28 including the SCRs 84 and 86 (10) which, through the primaries 42P, 44P, control the secondaries 42S (9), 44S (10) of the SCRs 38 and 40 (10). The secondary 65S5 (17) acts as a reference for setting the current through the trimmer 92 (14) to correspondingly increase the current at the base of the transistor 90 (13). This adds to the voltage in the base of the transistor and enables more current to pass therethrough from the rectifier 80 (12).

As the voltage of the battery builds up and reaches its maximum level, the turning off step is performed by the secondary 66S1 (15) which is bucked by the increasing voltage in terminals 48 and 60, (14, 13) thus causing SCR 70 (16) to turn off. When that happens, the primaries 66P and 68P (16) lose voltage and the PHASE FIRING NETWORK 28 (8) is shut down via 68S2 (14) and transistor 88 (14) and the differential voltage across the secondary 66S1 (15) is turned off and the sensing function is returned to the trimmer potentiometer 76 (12). This is the low level battery sensing element.

The circuitry at the upper portion of FIG. 3, as mentioned above includes a Warning Network 135 (2) controlled by the circuitry of FIG. 5. The network serves to indicate the condition of the battery for operating the magnet. A conductor 136 (4) leads from terminal 54 (18) and to a conductor 138 (4), and another conductor 140 in which is a GOOD light 142, green, the conductor 140 then leading to another conductor 143 in turn leading to a transistor 144 forming part of a Darlington unit 146, and another conductor 148 leads from the emitter of the transistor 144 to a conductor 150 which then leads to the conductor 63 (5), identified above, returning to the terminal 62 (18) and then to the battery.

In parallel with the GOOD light 142 is an adjustable potentiometer 154 (5) which upon adjustment thereof predetermines the upper voltage level of the battery for igniting the light 142.

The arrangement also includes an indication of an unsafe condition—the conductor 136 (4) leads to another conductor 156 (6) which leads to a conductor 158 (5) which includes a DO NOT USE light 160, red, the conductor 158 continuing to a conductor 162 (6) which leads to a transistor 164 in a Darlington unit 166. Leading from the transistor 164 is the conductor conductor 150 and the circuit is completed through the latter conductor and then conductor 63 (5) in return to the battery. Connected in parallel with the DO NOT USE light 160 is an adjustable potentiometer 168, adjustment of which predetermines the minimum voltage at which that light is lighted. In parallel with the light 160 (6) is a sound alert 170 (7) for actuation simultaneously with the light.

The circuitry 135 includes 114L*e* (2) that are closed in the normal operation of picking up the load. The network also includes normally closed contacts 172*b* (2) of a relay 172 (39) in FIG. 5 incorporated in a sub-circuit 173 (37). This sub-circuit includes a transformer 174 (36) connected with the main AC line 20 referred to above (8). The sub-circuit 173 includes an SCR 176 (39) controlled by a secondary 177S1 (41) the primary 177P of which appears at (53). In normal operation the contacts 172*b* (2) remain open, but upon deenergization of the secondary 177S (41) the contacts 172*b* close and signalling in the circuitry 135 (2) is produced. As long as the contacts 172*b* remain open, the GOOD light 142 remains on and the DO NOT USE light 160 remains extinguished, but when those contacts fall closed, the lights are reversed. Various signalling conditions are referred to hereinbelow.

In safe conditions, the relay 172 (39) is energized and the contacts 172*b* (2) remain open. In this condition the circuit through the resistor 178 (4) remains in circuit with normal control of the transistor network. If an unsafe condition occurs such, for example, as an overload condition as sensed by the thermal overload 67 (16), or too low a battery voltage, too high a charge current, or shorted load, then the relay 172 (39) de-energizes, allowing the contacts 172*b* (2) to close. This in effect shorts out the divider network 179 (4), and produces a direct connection at conductor 136 to terminal 180 (3). This conditions the Darlington unit 181 (5) of the network to turn off the green light 142, and the smaller Darlington unit 166 (6) is enabled, turning off the red light 160 and sound alert 170.

In FIG. 5 the potentiometer 182 (49) is referenced to the load current and if that current is at a satisfactory level, a circuit is completed through the SCR 184 (45). If the load draws excessive current for example, the biasing current to the SCR 184 (45) is bucked by the charge current which will work against the secondary 174S4 (49). When that current becomes too great the SCR 184 (45) turns off. This shuts off the primary 186P (45) which of course de-energizes the secondary 186S (56). This eliminates the bias to SCR 188 (53) and de-energizes the primary 177P (53) and that in turn de-energizes the secondary 177S (41) and the relay 172 de-energizes, with the consequence described above.

The sensing circuit 90 at the bottom of FIG. 5 senses low current, and if the current is too low, the SCR 188 (53) is de-energized. If the current is at minimum level it raises the biasing voltage via the potentiometer 192 (56) and the bias to SCR 188 (53), turning it on, and when it is turned on, the primary 177P (53), is energized and it energizes the secondary 177S (41). This turns on relay 172 with the consequence described above.

Referring to FIG. 6, this diagram shows the direct relation between the main source and the battery and the lift magnet. The main source is indicated at 20, the networks 26, 28 indicated together in a block, the conductor 46 leading through the ammeter 50, and conductors 52 and 56 to the battery. The conductor 100 leads from the conductor 52 to the ammeter 98 and then through the conductor 96 to the lift magnet 14. The arrows 194 indicate the direction of the current, but particularly the double arrow 194*a* shows divided current from the main source to both the battery and the lift magnet while the battery is being charged.

Attention is next directed to FIG. 8. This diagram includes a demagnetizing apparatus with the battery charge system of the invention incorporated therein. The consideration of this application of the invention is the demagnetizing apparatus includes a magnet, incorporated in a chuck, for holding a workpiece down in place while a work operation is being performed thereon, as in a grinder. In the use of such a machine it is desired that the main supply source be the constant source for energizing the magnet, but if that source should be interrupted, the battery will act as a standby and serve to so energize the magnet in the chuck.

The chuck, and the machine tool in which it is incorporated, in themselves may be of known kind, such for example as that shown in U.S. No. Re. 25,607, issued June 30, 1964, to Arthur K. Littwin. FIG. 7 herein shows a similar apparatus diagrammatically, where a grinder 200 has a grinding wheel 202 arranged for performing a grinding operation on a workpiece 204. The workpiece is held on a reciprocating table 206 by a magnetic chuck 208 of known kind which includes an electromagnet 210 shown in FIG. 8 (75). The electrical diagram of FIG. 8 is similar to, or the equivalent of the operating diagram of FIG. 5 of the above mentioned patent. As a general description, the electrical circuit of FIG. 8 herein includes a main source 212 (58) leading to a power transformer 214, to the secondary of which is connected a voltage-level selector unit 216 (68). The unit 216 has a rotor arm 218 successively engageable with a circular series of contacts 220 connected with corresponding tappings 222 from the transformer. The AC from the transformer is transmitted through the unit 216 to rectifiers 224 (62) having output conductors 225 and 226 leading to a contactor assembly 227 (67) for reversing the resulting DC which is transmitted to the magnet 210 (75). The DC thus transmitted to the magnet is consequently of lower value in successive steps, and that fact together with the reversing steps, results in demagnetizing the magnet. However, in the actual grinding operation, it is of course desired that the magnet be continuously energized, and the present invention is provided as a standby arrangement for assuring that condition, if the main source should be interrupted. In the right-hand portion of the diagram of FIG. 8 is a component 228 (63) containing various elements such as limit and reversing switches, etc. as disclosed fully in the above mentioned patent.

FIG. 8 also includes other elements, of the battery charge system of the present invention, including the battery 18 (81). The magnet 210, in the operation of the device of the invention, is similar to the magnet 14 (26), but of course different in physical construction.

The incoming current from the power transformer 214 is available at terminals 230, 232 (65), picking up relay 234 (65). An ON/OFF switch 236 (75) is turned to ON position which completes a circuit through switch 238 (77) which is in FULL position. A circuit is then completed through a power switch 240 (75) through NC contacts 242b (73), then leading to the right through standby contacts 234b, 234c and then to the latch coil 246L of the latch relay 246 (71), it being recalled that the contacts 234b, 234c, are closed when power is provided at the terminals 230, 232 (63). The coil 246L upon energization closes the contacts 246L1 (73) enabling the other coil 246U to be energized when the circuit is otherwise activated. The coil 246L closes the contacts 246L2 (71) energizing the relay 242 (69). Simultaneously, acting through the conductor 248 (73), the latch coil 246L energizes the forward field 250 (67) of the drive motor 252, which drives the selector arm 218 (88). At this time, the ON switch 254 (69) is in ON position. Current is thereby supplied to the magnet 210 (75) through the conductors 255, 256 (75) which lead from the contactor assembly 227 (67) identified above.

A unit 260 (75) is interposed at the magnet. A power resistor 262 provides a control voltage drop when current is supplied to the magnet. This adjustable resistor is used in conjunction with the stage or sensing module 263 (79) to sense the current to the chuck. In this module is a relay 264 which is energized upon satisfactory current being supplied to the magnet, and de-energized when the current falls below that value. When the coil 246L (71) is in energized position, the contacts thereof 246L3, 246L4 (79) are closed, these contacts being in conductors 266 and 268 parallel with the output of the rectifiers 224 (62) and connected with the conductors 225, 226 leading therefrom. As long as this condition persists, power will continue to be supplied to the relay 234 (65) and the corresponding normally closed contacts 234c, 234d, 234e, 234f (80, 79). Accordingly the components 135, 26, 28 (80) which are incorporated in FIG. 3, will be isolated from the main demagnetizing apparatus represented in FIG. 8.

If, for example, a fuse is blown such as 270 (64) or the power is interrupted or lost from the main source 212, the relay 234 (65) will of course be de-energized. This will close the contacts 234c, 234d, 234e, 234f, just referred to, thus putting the battery voltage across the magnet. The circuit from the battery to the chuck is apparent,—from the positive side through the conductor 272 through the contacts 234e, 234f, conductor 268; on the negative side, through the conductor 274, through contacts 234c, 234d, to the conductor 266 to the chuck. When the operator wishes to turn off the demagnetizing apparatus and remove a part from the chuck (from the magnet) he moves the switch 236 (75) to the OFF position which establishes a circuit through the conductor 276 (74) to the conductor 278 (74) through the contacts 246L1 (73) which are then closed, to the unlatching coil 246U (71). This closes the contacts 246U1 (71) completing the circuit through the OFF limit switch 280 and then through the drive motor 252 (67). When this occurs, the coil 246L (72) is de-energized, and the contacts 246L3, 246L4 (78) are opened. Thus the battery is isolated from the magnet and power failure at this point will not energize the magnet.

We claim:

1. A battery charge system, comprising
   a magnet adapted to hold a load,
   a battery,
   an electrical power source,
   circuitry operably interconnecting the magnet, battery and power source, and including an SCR,
   a power transformer deriving power from the source and operable, when connected with the battery, for charging the battery,
   a control transformer deriving power from the source,
   valve means interposed between the power transformer and the battery,
   means for sensing minimum voltage level of the battery,
   means for sensing maximum voltage of the battery, and
   means controlled by the minimum voltage sensing means and operative for turning on the SCR and thereby connecting the power source and the battery, and controlled by the maximum voltage sensing means and operative for turning off the SCR and thereby disconnecting the power source from the battery.

2. A battery charge system according to claim 1 wherein,
   the magnet is a transfer magnet operative for picking up and holding a load against gravity.

3. A battery charge system according to claim 1 wherein
   a rectifier is interposed between the power transformer and the battery, and an AC circuit thereby leads from the power transformer to the rectifier, and
   the control means includes back-to-back SCR's in said AC circuit.

4. A battery charge system according to claim 3 and including.
   a control transformer in the ciruitry isolated from the power transformer, and control means responsive to the control transformer for controlling the back-to-back SCR's.

5. A battery charge system according to claim 4 and including,
   a second control transformer connected to said power source,
   signal means operably connected with the battery to indicate the voltage level thereof, and
   means controlled by said second control transformer for operating said signal means in response to a corresponding level of voltage of the battery.

6. A battery charge system according to claim 4 wherein,
   the magnet is operable for holding a load down against lateral displacement, and
   the system includes means for constantly maintaining connection between the power source and the magnet, and means operable in response to failure of the power source for connecting the battery with the magnet.

7. A battery charge system according to claim 1 wherein, the magnet is a hold-down magnet operative for holding down a load above it, against lateral displacement, the circuitry is operative for establishing interconnection between the source and the magnet, and control means operative in response to failure of the source for effecting interconnection between the battery and the magnet in response to failure of the source.

8. A battery charge system according to claim 7 wherein, the control means is operative for effecting interconnection between the source and both the magnet and battery, pursuant to re-establishment of the source, whereby the source again energizes the magnet and charges the battery.

9. A battery charge system according to claim 7 wherein, said last means is operable for interconnecting the power source with the magnet in all conditions of connection and disconnection between the power source and the battery.

10. A battery charge system according to claim 9 and including, manually controlled latch relay means for controlling connection between the power source and the magnet.

* * * * *